(12) United States Patent
Zhou et al.

(10) Patent No.: US 9,399,699 B1
(45) Date of Patent: Jul. 26, 2016

(54) COMPOSITIONS COMPRISING POLYESTER FOR 3D PRINTING

(71) Applicant: XEROX CORPORATION, Norwalk, CT (US)

(72) Inventors: Ke Zhou, Oakville (CA); Guerino G. Sacripante, Oakville (CA); Michael S. Hawkins, Cambridge (CA); Edward G. Zwartz, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/695,598

(22) Filed: Apr. 24, 2015

(51) Int. Cl.
*C08G 63/02* (2006.01)
*C08G 63/183* (2006.01)
*C08G 64/00* (2006.01)

(52) U.S. Cl.
CPC .................................. *C08G 63/183* (2013.01)

(58) Field of Classification Search
CPC ..................................................... C08G 63/183
USPC ......................................... 528/271, 272, 302
See application file for complete search history.

(56) References Cited

U.S. PATENT DOCUMENTS

| 8,460,451 B2 | 6/2013 | Xu et al. |
| 2008/0211135 A1* | 9/2008 | Eipper .................... B32B 27/36 264/225 |

* cited by examiner

*Primary Examiner* — Terressa Boykin
(74) *Attorney, Agent, or Firm* — Pillsbury Winthrop Shaw Pittman LLP

(57) ABSTRACT

A composition for use in 3D printing includes a polyester resin including a 1,4-butanediol (BDO) monomer unit and a terephthalate monomer unit, the polyester resin being provided in a powdered form with a particle size in a range from about 100 microns to about 500 microns.

19 Claims, 1 Drawing Sheet

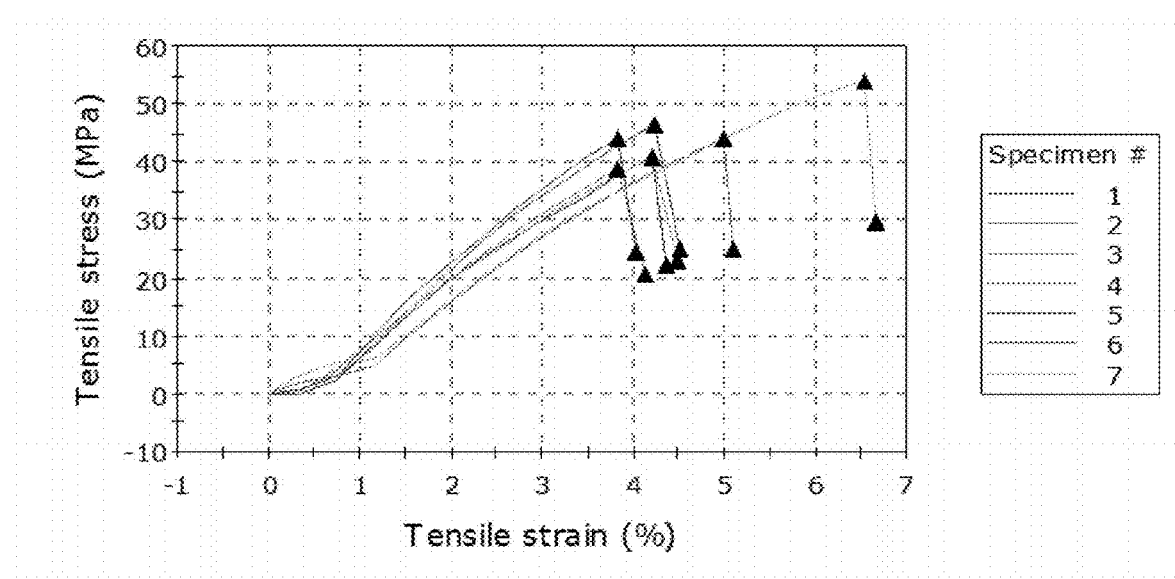

COMPOSITIONS COMPRISING POLYESTER FOR 3D PRINTING

BACKGROUND

The present disclosure relates to 3D printing. In particular, the present disclosure relates to new materials for 3D printing based on sustainable polyester compounds.

The selective laser sintering (SLS) technique for additive manufacturing (3D printing) uses a rasterized laser to "scan" over a bed of polymer powder, sintering it to form solid shapes in a layer-wise fashion. The material used for SLS is typically powdered polymers, either alone or in composite form. A selection of specifications and capabilities to meet various needs of downstream applications provides the impetus to develop new materials for 3D printing via the SLS process.

SUMMARY

In some aspects, embodiments herein relate to compositions for use in 3D printing comprising a polyester resin comprising (a) a 1,4-butanediol (BDO) monomer unit and (b) a terephthalate monomer unit, wherein the polyester resin is provided in a powdered form with a particle size in a range from about 100 microns to about 500 microns.

In some aspects, embodiments herein relate to methods of making a polyester resin comprising copolymerizing in the presence of a catalyst a mixture comprising (a) a 1,4-butanediol (BDO) monomer unit and (b) a depolymerized polyethylene terephthalate, wherein copolymerizing is conducted at a temperature in a range from about 150° C. to about 220° C., and the methods comprising removing any excess BDO monomer unit under reduced pressure.

In some aspects, embodiments herein relate to methods of 3D printing comprising providing a polyester resin for use in 3D printing on a substrate, the polyester resin comprising (a) about 10 mole percent to about 40 mole percent a 1,4-butanediol (BDO) monomer unit and (b) about 60 mole percent to about 90 mole percent a terephthalate monomer unit, wherein the polyester resin is optionally disposed in a matrix material as a composite, and the methods comprising subjecting the polyester resin or the composite thereof to selective laser sintering to form 3D object on the substrate.

BRIEF DESCRIPTION OF DRAWINGS

Various embodiments of the present disclosure will be described herein below with reference to the FIGURES wherein:

FIG. 1 shows a plot indicating a rheology comparison of polyester resins in accordance with embodiments herein with commercial 3D materials.

DETAILED DESCRIPTION

Embodiments herein provide bio-derived polyester resins for use in selective laser sintering (SLS) 3-D printing technology. The polyester resins are low cost polymers, and may be synthesized from oligomers that utilize recycled plastics, such as PET (Polyethylene terephthalate). Other components to balance the mechanical properties may be derived from sustainable monomers with positive life cycle analysis including bio-based diols such as 1,4-butanediol (BDO). The polyester resins disclosed herein meet the mechanical robustness demands of 3-D printing while offering environmentally sound materials.

Embodiments herein provide sustainable polyester resins for use in SLS 3-D printing technology. For example, the sustainable polyester resins may include low cost PEBT polymers which may be synthesized from oligomers obtained from recycled plastics and bio based monomers according to Equation 1 below.

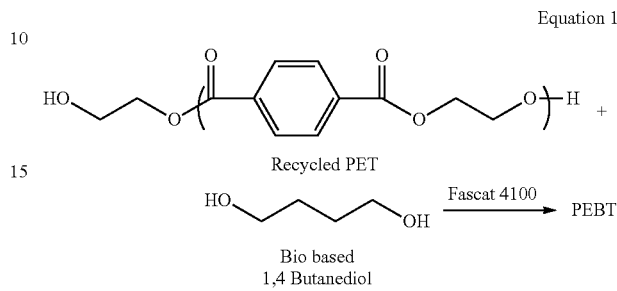

Equation 1

In accordance with the exemplary embodiment of Equation 1, sustainable copolymers may be obtained from depolymerizing polyethylene terephthalate plastic bottles and bio-based 1,4-butane-diol, such as from the fermentation of glucose or corn starch. A commercially available source of depolymerized product of recycled PET plastic bottles (Polylite, Reichhold Corporation) is an oligomer with Mw of about 800. Exemplary diol, 1,4-butanediol (BDO) is available from bioamber and may be added at different ratios to balance the mechanical properties of the final product.

In embodiments, there are provided compositions for use in 3D printing comprising a polyester resin comprising a 1,4-butanediol (BDO) monomer unit and a terephthalate monomer unit, wherein the polyester resin is provided in a powdered form with a particle size in a range from about 100 microns to about 1000 microns, or from about 100 microns to about 500 microns.

In embodiments, the composition consists essentially of the polyester resin. In embodiments, the composition is a composite and further comprises a matrix material in which the polyester resin is a poly (1,4-butylene-terephthalate), co-poly (1,4-butylene terephthalate)-co-poly (1,2-ethylene-terephthalate), poly (1,3-propylene terephthlate), co-poly (1,3-propylene-terephthalate)-co-poly (1,2-ethylene-terephthalate), poly (1,2-propylene terephthlate), co-poly (1,2-propylene-terephthalate)-co-poly (1,2-ethylene-terephthalate).

In embodiments, the matrix material is selected from the group consisting of a poly (1,4-butylene-terephthalate), co-poly (1,4-butylene-terephthalate)-co-poly (1,2-ethylene-terephthalate).

In embodiments, the BDO monomer unit is present in an amount in a range from about 10 to about 40 mole percent of the polyester.

In embodiments, the diol monomer unit is an aliphatic diol having 2 to 6 carbon atoms. In embodiments, the BDO monomer unit may be exchanged for other diol monomer units such as 1,3-propanediol, or 1,5-pentanediol or 1,6-hexanediol. In embodiments, such substitute diol monomer units for BDO may also be selected to be bio-derived as is 1,4-butanediol (BDO). In embodiments, the carbon chain of any diol unit, including BDO, may be optionally substituted at any carbon atom. Such optional substitution may include halogen, $C_1$-$C_4$ alkyl, $C_1$-$C_4$ alkoxy, and combinations thereof.

In embodiments, the terephthalate monomer unit is provided as bis-ester for polyester resin. When 3D printing with the polyester resins disclosed herein there may be provided a support material. This material is generally removable and serves as a temporary support when making complex three-dimensional objects. Suitable support materials are well known in the art. See for example, U.S. Pat. No. 8,460,451 which is incorporated herein by reference in its entirety.

The support material may be delivered through the same or different print head as the polyester resin material. The support material is often delivered as a liquid and typically comprises a hydrophobic chemical material that is solid at ambient temperature and liquid at elevated application temperatures. However, unlike the polyester resin material, the support material is subsequently removed to provide the finished three-dimensional part.

Removal of the support material can be accomplished through several processes, including heating the support material to a temperature above its melting point in conjunction with the use of a suitable organic carrier to sufficiently remove the support material from the polyester resin material.

In embodiments, a method of printing a three dimensional article comprises selectively depositing layers of a polyester resin, as disclosed herein, as a build material to form the three dimensional article on a substrate, the build material may optionally include a diluent. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

For example, the terephthalate group may be the bis-methyl ester, i.e., dimethyl terephthalate. Other bis-esters may include diethyl terephthalate, dioctyl terephthalate, and the like. That is, any $C_1$-$C_8$ alkyl diester of terephthalic acid may be employed as a starting material to access the polyester resins disclosed herein. In embodiments, the terephthalate group is sourced from recycled plastics, such as polyethylene terephthalate (PET). When employing recycled PET, the plastic may be partially or fully depolymerized. In particular embodiments, PET may be depolymerized to an effective average molecular weight of about 800, or in a range from about 600 to about 1,000. In embodiments, the aromatic ring of the terephthalate group may be optionally substituted at any carbon atom. Such optional substitution may include halogen, $C_1$-$C_4$ alkyl, $C_1$-$C_4$ alkoxy, and combinations thereof.

In embodiments, the polyester resin has a yield stress in a range from about 10 megapascals to about 100 megapascals.

In embodiments, the polyester resin has a yield strain in a range from about 1% to about 10%.

In embodiments, the polyester resin has a Young's Modulus in a range from about 0.5 to about 5 gigapascals.

In embodiments, the polyester resin has a breaking strain in a range from about 10% to about 100%.

In embodiments, the polyester resin has a breaking stress in a range from about 10 megapascals to about 100 megapascals.

In embodiments, the polyester resin has a glass transition temperature of from about 50° C. to about 80° C.

In embodiments, there are provided methods of making a polyester resin comprising copolymerizing in the presence of a catalyst a mixture comprising a 1,4-butanediol (BDO) monomer unit, and a depolymerized polyethylene terephthalate, wherein copolymerizing is conducted at a temperature in a range from about 150° C. to about 220° C. and the method further comprising removing any excess BDO monomer unit under reduced pressure, such as from about 1 mm-Hg to about 30 mm-Hg.

In embodiments, the catalyst is tin-based. Such catalysts may be based on tin (II) or tin (IV) oxidation states. In embodiments, the tin-based catalyst are mono- or dialkyl tin-based. Monoalkyl tins may further comprise oxide and/or hydroxide groups at the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the polyester resins herein, such as octabutyltetrathiocyanatostannoxane.

In embodiments, the BDO monomer unit is present in a range from about 10 mole percent to about 40 mole percent of the mixture.

In embodiments, the depolymerized polyethylene terephthalate is present in a range from about 60 mole percent to about 90 mole percent of the mixture.

In embodiments, the depolymerized polyethylene terephthalate is derived from a recycled polyethylene terephthalate.

In embodiments, methods further comprise milling (grinding) the polyester resin into a powder. In embodiments, the powder has a particle size in a range from about 100 microns to about 300 microns.

In embodiments, there are provided methods of 3D printing comprising providing a polyester resin for use in 3D printing on a substrate comprising about 10 mole percent to about 40 mole percent of a 1,4-butanediol (BDO) monomer unit and about 60 mole percent to about 90 mole percent a terephthalate monomer unit, wherein the polyester resin is optionally disposed in a matrix material as a composite, and the methods further comprising subjecting the polyester resin or the composite thereof to selective laser sintering to form 3D object on the substrate. In embodiments, the matrix material becomes part of the 3D object along with the polyester resin. In embodiments, the polyester resin is in a powder form having a particle size in a range from about 100 microns to about 300 microns.

When 3D printing with the polyesters disclosed herein there may be provided a support material. This material is generally removable and serves as a temporary support when making complex three-dimensional objects. Suitable support materials are well known in the art. See for example, U.S. Pat. No. 8,460,451 which is incorporated herein by reference in its entirety.

The support material may be delivered through the same or different print head as the polyester material. The support material is often delivered as a liquid and typically comprises a hydrophobic chemical material that is solid at ambient temperature and liquid at elevated application temperatures. However, unlike the polyester material, the support material is subsequently removed to provide the finished three-dimensional article.

Removal of the support material can be accomplished through several processes, including heating the support material to a temperature above its melting point in conjunction with the use of a suitable organic carrier to sufficiently remove the support material from the polyester resin material.

In embodiments, a method of printing a three dimensional article comprises selectively depositing layers of a polyester resin, as disclosed herein, as a build material to form the three dimensional article on a substrate, the build material may optionally include a diluent, although this may be for the purpose of integrating into printing systems other than SLS printing. In embodiments, a method of printing a three dimensional article further comprises supporting at least one layer of the build material with a support material. Additionally, the build material and/or support material, in embodiments of methods described herein, is selectively deposited according to an image of the three dimensional article, the image being in a computer readable format.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

This example describes the preparation and characterization of sustainable polyester resins in accordance with embodiments disclosed herein.

Synthesis

Sample 1, 90/10 PEBT:

To a 1-L Parr reactor equipped with a mechanical stirrer, distillation apparatus and a bottom drain valve, was added 604.73 g of depolymerized recycled PET from Reichhold, 28.42 g of 1,4 butanediol and 2 g of Sn catalyst Fascat 4100. The mixture was heated to 160° C. under a nitrogen purge (1 scfh), and then slowly increased to 195° C. over a 3 hour period and maintained for an additional 18 hours to allow trans-esterification between 1,4 butanediol and depolymerized PET. The mixture was then heated from 190° C. to 210° C. over a one hour period and then vacuum was applied to remove excess butanediol to allow polycondensation. The mixture was then heated at 215° C., while under vacuum, until a softening point of 175° C. was reached.

Sample 2, 80/20 PEBT:

To a 1-L Parr reactor equipped with a mechanical stirrer, distillation apparatus and a bottom drain valve, was added 604.18 g of depolymerized recycled PET from Reichhold, 56.80 g of 1,4 butanediol and 2.01 g of Sn catalyst Fascat 4100. The mixture was heated to 160° C. under a nitrogen purge (1 scfh), and then slowly increased to 195° C. over a 3 hour period and maintained for an additional 18 hours to allow trans-esterification between 1,4 butanediol and depolymerized PET. The mixture was then heated from 190° C. to 210° C. over a one hour period and then vacuum was applied to remove excess butanediol to allow polycondensation. The mixture was then heated at 250° C., while under vacuum, until a softening point of 173.4° C. was reached.

Sample 3, 70/30 PEBT:

To a 1-L Parr reactor equipped with a mechanical stirrer, distillation apparatus and a bottom drain valve, was added 580.01 g of depolymerized recycled PET from Reichhold, 81.96 g of 1,4 butanediol and 2.01 g of Sn catalyst Fascat 4100. The mixture was heated to 160° C. under a nitrogen purge (1 scfh), and then slowly increased to 195° C. over a 3 hour period and maintained for an additional 18 hours to allow trans-esterification between 1,4 butanediol and depolymerized PET. The mixture was then heated from 190° C. to 210° C. over a 75 minute period and then vacuum was applied to remove excess butanediol to allow polycondensation. The mixture was then heated at 250° C., while under vacuum, until a softening point of 181.3° C. was reached.

Sample 4, 60/40 PEBT:

To a 1-L Parr reactor equipped with a mechanical stirrer, distillation apparatus and a bottom drain valve, was added 560.68 g of depolymerized recycled PET from Reichhold, 105.97 g of 1,4-butanediol (BDO) and 2.01 g of Sn catalyst Fascat 4100. The mixture was heated to 160° C. under a nitrogen purge (1 scfh), and then slowly increased to 190° C. over a three hour period and maintained for an additional 18 hours to allow trans-esterification between 1,4 butanediol and depolymerized PET. The mixture was then heated from 190° C. to 215° C. over a 1.5 hour period and then vacuum was applied to remove excess butanediol to allow polycondensation. The mixture was then heated to at a final temperature of 250° C., while under vacuum, until a softening point of 193.7° C. was reached.

FIG. 1. Rheology comparison of PEBT resins and commercial 3D materials

Above FIGURE shows that at reaction temperature, which is about at 210° C. to 220° C., the material has viscosity around 100 to 300 Pa·S or even higher, which is high enough to discharge in filament form under pressure.

The video below demonstrated how filament was extruded under pressure and wound directly after 3D material was synthesized.

Mechanical Properties

Resin filaments were made using the Melt Flow Index (MFI) instrument, by melting the sample of resin in the heated barrel and extruding it through an orifice of a specific diameter, under a certain weight. The mechanical properties of the resin filaments were measured using the Instron Tensile Testing System and compared with the commercial ABS and PLA 3D materials. These results show that PEBT with 60/40 ratio is the most promising resin, giving similar Instron results as the commercial 3D materials.

TABLE 1

Instron comparison of PEBT resins with commercial 3D materials.

|  | PET/BDO Mole Ratio | Yield Stress (MPa) | Yield Strain (%) | Breaking Stress (MPa) | Breaking Strain (%) |
|---|---|---|---|---|---|
| Control: ABS | — | 41.62 | 4.85 | 20.16 | 65 |
| Control: PLA | — | 67.82 | 5.31 | 28.82 | 26 |
| Sample 1 | 90/10 | 46.02 | 6.07 | 23.4 | 7.13 |
| Sample 2 | 80/20 | 40.69 | 7.41 | 21.78 | 9.84 |
| Sample 3 | 70/30 | 44.42 | 7.05 | 12.65 | 49.95 |
| Sample 4 | 60/40 | 49.20 | 11.23 | 7.68 | 43.34 |

The data in the table shows that BEPT at 60/40 ratio gives both yield stress and breaking strain right in between ABS and PLA.

Powder Preparation of PEBT Resins

PEBT resin with 70/30 PET/BDO ratio were ground using coarse grinder to less than 250 micron and then by jet mill to an average particle size about 5 micron. Particle size distribution of the 5 micron one is shown below.

What is claimed is:

1. A composition for use in 3D printing comprising:
   a polyester resin comprising:
   a 1,4-butanediol (BDO) monomer unit; and
   a terephthalate monomer unit, wherein the BDO monomer unit is present in an amount in a range from about 10 to about 55 mole percent of the polyester;
   further wherein the polyester resin is provided in a powdered form with a particle size in a range from about 100 microns to about 500 microns.

2. The composition of claim 1, wherein the composition consists essentially of the polyester resin.

3. The composition of claim 1, wherein the composition is a composite and further comprises a matrix material in which the polyester resin is disposed.

4. The polyester composition of claim 3, wherein the matrix material is selected from the group consisting of poly (1,4-butylene-terephthalate), co-poly (1,4-butylene-terephthalate)-co-poly (1,2-ethylene-terephthalate), poly (1,3-propylene terephthlate), co-poly (1,3-propylene-terephthalate)-co-poly (1,2-ethylene terephthalate), poly (1,2-propylene terephthlate), and co-poly (1,2-propylene-terephthalate)-co-poly (1,2-ethylene-terephthalate).

5. The composition of claim 1, wherein the polyester resin has a yield stress in a range from about 10 megapascals to about 100 megapascals.

6. The composition of claim 1, wherein the polyester resin has a yield strain in a range from about 1% to about 10%.

7. The composition of claim 1, wherein the polyester resin has a Young's Modulus in a range from about 0.5 to about 5 gigapascals.

8. The composition of claim 1, wherein the polyester resin has a breaking strain in a range from about 10% to about 100%.

9. The composition of claim 1, wherein the polyester resin has a breaking stress in a range from about 10 megapascals to about 100 megapascals.

10. The composition of claim 1, wherein the polyester resin has a glass transition temperature of from about 50° C. to about 80° C.

11. A method of making a polyester resin comprising:
copolymerizing in the presence of a catalyst a mixture comprising:
a 1,4-butanediol (BDO) monomer unit; and
a depolymerized polyethylene terephthalate;
wherein copolymerizing is conducted at a temperature in a range from about 150° C. to about 220° C.; and
removing any excess BDO monomer unit under reduced pressure.

12. The method of claim 11, wherein the catalyst is tin-based.

13. The method of claim 11, wherein the BDO monomer unit is present in a range from about 10 mole percent to about 40 mole percent of the mixture.

14. The method of claim 11, wherein the depolymerized polyethylene terephthalate is present in a range from about 60 mole percent to about 90 mole percent of the mixture.

15. The method of claim 11, wherein the depolymerized polyethylene terephthalate is derived from a recycled polyethylene terephthalate.

16. The method of claim 11, further comprising milling the polyester resin into a powder.

17. The method of claim 16, wherein the powder has a particle size in a range from about 100 microns to about 300 microns.

18. A method of 3D printing comprising:
providing a polyester resin for use in 3D printing on a substrate, the polyester resin comprising:
about 10 mole percent to about 40 mole percent a 1,4-butanediol (BDO) monomer unit; and
about 60 mole percent to about 90 mole percent a terephthalate monomer unit;
wherein the polyester resin is optionally disposed in a matrix material as a composite; and
subjecting the polyester resin or the composite thereof to selective laser sintering to form 3D object on the substrate.

19. The method of claim 18, wherein the polyester resin is in a powder form having a particle size in a range from about 100 microns to about 300 microns.

* * * * *